J. W. JEPSON.
ELECTRICAL SYSTEM OF DISTRIBUTION.
APPLICATION FILED NOV. 12, 1915.
1,296,293.
Patented Mar. 4, 1919
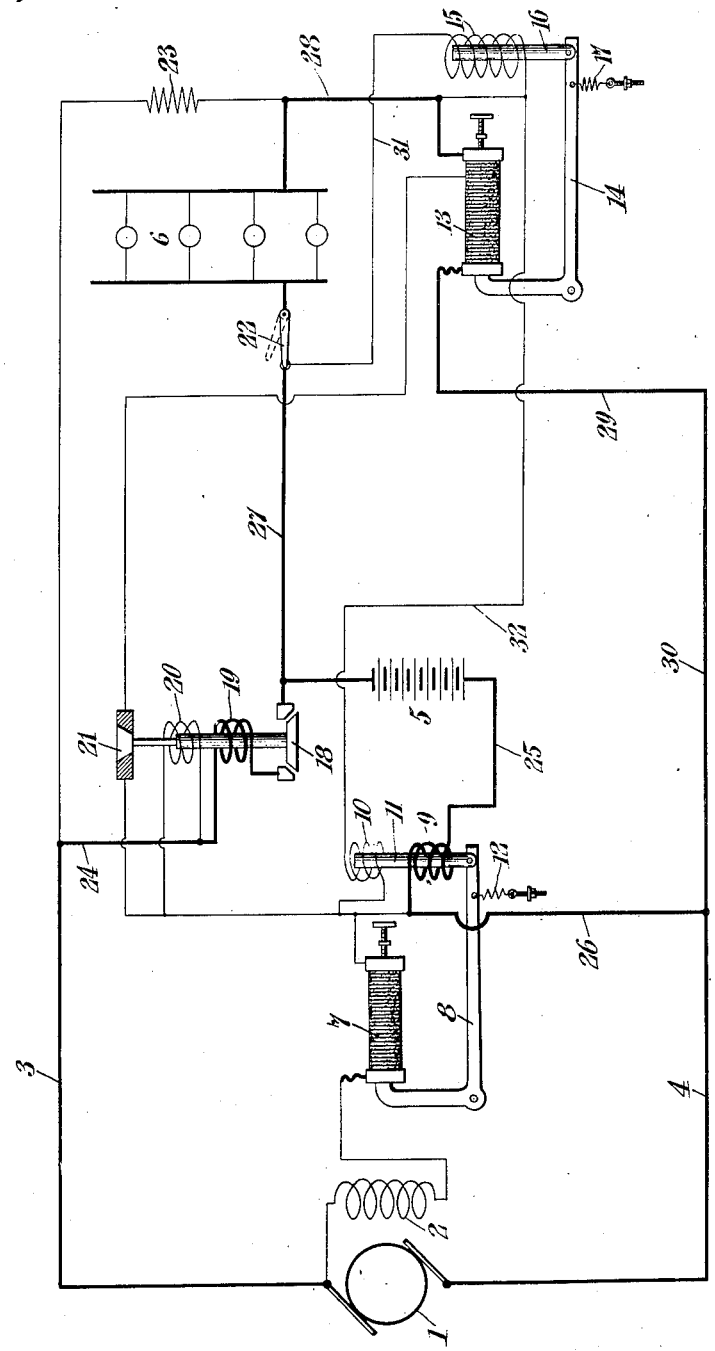
INVENTOR
John W. Jepson
BY
Kenyon & Kenyon
ATTORNEYS

UNITED STATES PATENT OFFICE.

JOHN W. JEPSON, OF BUFFALO, NEW YORK, ASSIGNOR TO GOULD COUPLER COMPANY, A CORPORATION OF NEW YORK.

ELECTRICAL SYSTEM OF DISTRIBUTION.

1,296,293. Specification of Letters Patent. Patented Mar. 4, 1919.

Original application filed November 27, 1907, Serial No. 404,272. Divided and this application filed November 12, 1915. Serial No. 61,031.

*To all whom it may concern:*

Be it known that I, JOHN W. JEPSON, a citizen of the United States, and resident of Buffalo, county of Erie, State of New York, have invented certain new and useful Improvements in Electrical Systems of Distribution, of which the following is a specification.

This application is a division of my prior application, Ser. No. 404,272, filed November 27, 1907, for system of electrical distribution.

My invention relates to improvements in systems of electrical distribution. It pertains more particularly to the so-called axle-driven electric car lighting system in which the generator which furnishes the supply of electrical energy is driven from an axle. It is, however, applicable to systems of electrical distribution which are used for other purposes. In an axle-driven car lighting system, the generator furnishes current to operate lamps or other translating devices and charge a storage battery. The storage battery is used to operate the lamps when the generator is inoperative. Inasmuch as the speed of the generator varies, its output tends to vary. Accordingly, it becomes necessary to regulate the electrical conditions in the system. The system is provided with two regulators, one for regulating the generator to confine its output within a predetermined limit and the other for regulating the voltage that is impressed upon the lamps. In order to charge the storage battery it is necessary to allow the generator voltage to rise above the normal lamp voltage. The lamp voltage, however, is kept practically constant by means of the lamp regulator, and thus the lamps are protected from an excessive voltage.

More specific objects and features will more clearly appear from the detailed description given below and the claims which follow, taken in connection with the accompanying drawing, which forms a part of this specification.

The accompanying drawing illustrates one of the forms which my invention may assume.

The generator is provided with an armature 1 and a shunt field winding 2. From the generator extends a main circuit having conductors 3, 4. Through this circuit current is supplied to a storage battery 5 and lamps or other translating devices 6. The battery and the lamps are arranged in parallel branches of the main circuit, the battery being arranged in the battery branch of circuit and the lamps being arranged in the lamp branch of circuit. The generator regulator may be a rheostat having a pile of contacting electrodes 7 arranged in the shunt field circuit. These electrodes are preferably carbon disks. One end of the pile of electrodes is engaged by a lever 8. This lever is operated by means of a magnet having two coils 9 and 10. This magnet attracts a plunger 11 connected to the lever. The electrodes are normally pressed together by means of a spring 12 which acts upon the lever. When the plunger 11 is attracted by the coils 9 and 10, the lever is drawn upwardly, thereby relieving the pressure between the electrodes and increasing the resistance of the pile of electrodes.

The lamp regulator which regulates the voltage impressed upon the lamps may be a rheostat having a pile of electrodes like the generator regulator. One end of this pile of electrodes is engaged by a lever 14 that is operated by means of a coil 15 which attracts a plunger 16 connected to the lever. The electrodes are normally pressed together by means of a spring 17, which acts upon the lever. When the coil 15 attracts the plunger 16 the plunger is drawn upwardly, thereby relieving the pressure between the electrodes and increasing the resistance of the pile of electrodes. The coil 15 is connected across the lamp circuit inside the pile of electrodes 13 so as to be subjected to the same voltage as is impressed upon the lamps.

The coil 9 is connected in the battery circuit so as to be subjected to the battery charging current. The coil 10 is connected across the lamp regulator, it being connected in the present instance across the pile of electrodes 13, so that it likewise is traversed by current flowing to the lamps. Hence, the current in this coil depends upon the drop in the resistance across the pile of electrodes 13.

The main circuit is provided with an automatic switch 18 which is operated by means of a series winding 19 and a shunt winding 20. The series winding is connected in the main circuit with the switch 18. The shunt winding 20 is connected across the main circuit. When the generator voltage becomes equal to that of the storage battery, the winding 20 closed the main switch. The series winding 19 then becomes energized and assists the shunt winding in keeping the main switch closed. When the generator voltage falls below that of the storage battery, the storage battery discharges back through the main circuit. The series winding 19 then opposes the shunt winding 20 and causes the main switch to open.

In order to reduce the regulating effect of the pile of electrodes when the battery furnishes the current to operate the lamps, I provide an auxiliary switch 21 on top of the movable main switch core so that it is operated by the same windings as the main switch. When the main switch is closed, the auxiliary switch is opened, and vice versa. The auxiliary switch is connected in circuit to short circuit a part of the pile of electrodes 13 when it is closed and thereby also complete a shunt circuit about the coil 10.

The lamp circuit is provided with a switch 22 by means of which the circuit of the lamps may be opened. Across this circuit is connected a resistance 23, which is independent of the switch 22, and serves as a permanent load upon the lamp circuit. This load is provided so that there will always be a sufficient drop in voltage across the lamp regulator to cause the winding 10 of the generator regulator to perform its function.

I shall now proceed to describe the operation of my system. I shall assume that the normal voltage of the storage battery is 64 volts, and that about 60 volt lamps are used. When the voltage developed by the generator is greater than that of the storage battery, the main switch 18 is closed. Current then flows from the positive terminal of the generator through conductor 3, conductor 24, series winding 19 to switch 18. Here it divides, one part flowing through the battery 5, conductor 25, winding 9 and conductor 26, and the other part through conductor 27, switch 22, lamps 6, conductor 28, electrodes 13, conductors 29 and 30. Then it reunites in conductor 4 and returns to the negative terminal of the generator. When the voltage upon the lamp circuit tends to rise above the normal lamp voltage the strength of the coil 15 increases as this coil is connected across the lamp circuit and is subjected to the same voltage as the lamps. Its circuit extends from the conductor 27 through conductor 31, coil 15 to the conductor 28. The increase in the strength of the coil 15 reduces the pressure between the electrodes 13, thereby increasing the resistance of these electrodes. The resistance in the lamp circuit is thus increased sufficiently to maintain practically constant voltage upon the lamps.

The current which the generator sends through the storage battery increases as the voltage of the generator increases at the terminals of the battery. Hence, when the generator voltage increases, the strength of coil 9 increases. The increase of strength of the coil 9 causes a reduction in the pressure between the electrodes 7 and thereby increases the resistance of these electrodes. The field strength of the generator is thus reduced sufficiently as the speed of the armature increases to prevent the voltage from rising above a predetermined limit, the action of the coil 9 being supplemented by the action of the coil 10. When the generator voltage increases, there is a tendency of the voltage upon the lamp circuit to increase. Accordingly, the resistance of the electrodes 13 is increased as previously explained. This increase in the resistance of these electrodes causes more current to flow through the coil 10, as this coil is connected across the electrodes. Its circuit extends from the conductor 28 through conductor 32, coil 10 to conductor 26.

As the battery approaches the condition of being fully charged, its counter-electromotive force rises very rapidly and the charging current decreases perceptibly Hence, the coil 9 is weakened. If the resultant action of the weakening of the coil 9 were not counteracted, the field strength of the generator would be increased and accordingly the generator would increase its voltage in accordance with the rise in the counter-electromotive force of the battery, thereby causing an abnormal flow of current through the battery.

As the voltage of the generator tends to rise it causes the resistance of the electrodes 13 to be increased, which results in the strength of the coil 10 being increased. Hence, the coil 10 counteracts the effect which tends to come from the weakening of the coil 9. Accordingly, the generator impresses substantially constant voltage upon the storage battery at constant speed and in consequence, as the counter-electromotive force of the battery rises, the battery charging current falls off. In other words, a tapering charge is produced. Thus normally the coil 10, though current is all the while flowing through it, acts merely as a constant and takes no substantial part in the regulation. When, however, the battery voltage rises, tending to cause an increased voltage across the lamps, then the coil 15 acts to increase the resistance of pile 13 which in turn acts to greatly increase the strength of the coil 10 and thereby make it effective in cutting down the battery charging current.

In order to keep the coil 10 energized, it is necessary to maintain a load upon the lamp circuit. When the lamp load is taken off by opening the switch 22, the resistance 23 maintains a load upon the lamp circuit. Thus the action of the coil 10 is preserved even though the lamps are out of circuit.

When the battery furnishes the current to operate the lamps, it is still desirable to regulate the voltage that is impressed upon the lamps as it is sometimes the case that when the battery is nearly fully charged, the battery voltage is slightly higher than the normal lamp voltage. The minimum resistance of the whole pile of electrodes 13 is so great that it would reduce the lamp voltage below the desired amount. In order, therefore, to reduce the minimum resistance of the electrodes 13, I provide the auxiliary switch 21, which short circuits a part of the electrodes 13.

Having thus described my invention, what I claim as new and desire to secure by Letters Patent of the United States, is:

1. In apparatus of the class described, in combination, a generator, a storage-battery and lamps adapted to receive current from said generator, a device adapted to connect said generator with said battery upon the generator voltage attaining a predetermined value and to disconnect the same upon said battery discharging back through said generator, a pressure controlled variable resistance medium interposed between said battery and lamps, means controlled in accordance with the voltage across said lamps adapted to vary said resistance to tend to maintain said voltage constant, and means adapted to shunt a portion of said medium upon said device disconnecting said generator from said battery.

2. In apparatus of the class described, in combination, a generator, a storage-battery and lamps adapted to receive current from said generator, means adapted to connect said generator with said battery and lamps at predetermined times, a pressure controlled variable resistance medium interposed between said battery and lamps and adapted to maintain constant the voltage at said lamps, and means controlled in accordance with the position of said first means adapted to short-circuit a portion of said medium when said generator is disconnected from said battery and lamps.

3. In combination, a generator, a main circuit extending therefrom and divided into a battery circuit and a lamp circuit, a storage battery connected in the battery circuit and translating devices connected in the lamp circuit, a lamp regulator operatively connected in the lamp circuit to regulate the voltage impressed upon the lamps, and means for modifying the action of the regulator when the battery furnishes the current to operate the lamps.

4. In combination, a generator, a main circuit extending therefrom and divided into a battery circuit and a lamp circuit, a storage battery connected in the battery circuit and translating devices connected in the lamp circuit, an automatically variable resistance for regulating the voltage impressed upon the lamps, and an automatic switch for short circuiting a part of said resistance when the battery furnishes the current to operate the lamps.

5. In combination, a generator, a main circuit extending therefrom and divided into a battery circuit and a lamp circuit, a storage battery connected in the battery circuit and translating devices connected in the lamp circuit, an automatically variable resistance connected in circuit to regulate the voltage impressed upon the lamps, an automatic switch adapted to short circuit a part of said resistance when the generator falls below a predetermined point and to open the short circuit when the generator voltage rises above a predetermined point.

6. In combination, a generator, a main circuit extending therefrom and divided into a battery circuit and a lamp circuit, a storage battery connected in the battery circuit and translating devices connected in the lamp circuit, an automatically variable resistance for varying the voltage impressed upon the lamp circuit, an automatic main switch adapted to close the main circuit when the generator voltage rises above a predetermined point, and to open said main circuit when the generator voltage falls below a predetermined point, and an auxiliary switch associated with said main switch and adapted to short circuit a part of said resistance when the main switch is opened and to open said short circuit when the main switch is closed.

7. A system of electrical distribution comprehending a generator, a storage battery and translating devices in operative relation thereto, a voltage controlled rheostat for governing the voltage upon the translating devices responsive to voltage variations across the translating devices, said rheostat having always an appreciable resistance, and current operated means for reducing the resistance between the battery and translating devices below the minimum value of said resistance.

8. A system of electrical distribution, comprising a generator and a storage battery and translating devices in operative relation thereto, means for regulating the generator to charge the battery, a carbon pile resistance in series with the translating devices, voltage operated means for controlling said carbon pile responsive to voltage variations across the translating devices and automatic means for reducing the resistance in circuit between the battery and translating devices below the minimum resistance of said carbon pile.

9. A system of electrical distribution comprehending a variable speed generator, a storage battery, and translating devices in operative relation thereto, a voltage controlled carbon pile rheostat in series with the translating devices for regulating the voltage on the translating devices, responsive to voltage variations across the translating devices, a switch controlled by voltage changes across the battery, and means whereby said switch acts to reduce the resistance in series with the translating devices when the battery supplies the translating devices.

10. A system of electrical distribution comprehending a generator, a storage battery and translating devices in operative relation thereto, a voltage controlled compressible variable resistance regulating the voltage on the translating devices responsive to voltage variations across the translating devices, a main switch automatically connecting the generator to feed the battery and translating devices and automatically disconnecting the generator while the battery feeds the translating devices and connections, whereby said switch acts to reduce the resistance in series with the translating devices when the battery supplies the translating devices.

11. A system of electrical distribution, comprehending a generator, a storage battery and translating devices in operative relation thereto, a compressible variable resistance automatically regulating the voltage applied to the translating devices responsive to voltage variations across the translating devices, a switch controlled by voltage changes across the battery and means whereby said switch acts to reduce the resistance in series with the translating devices when the battery supplies the translating devices.

In testimony whereof, I have signed my name to this specification.

JOHN W. JEPSON.